(12) United States Patent
Ruan et al.

(10) Patent No.: US 8,976,633 B1
(45) Date of Patent: Mar. 10, 2015

(54) DATA STORAGE DEVICE CALIBRATING FLY HEIGHT ACTUATOR BASED ON LASER POWER FOR HEAT ASSISTED MAGNETIC RECORDING

(71) Applicant: Western Digital Technologies, Inc., Irvine, CA (US)

(72) Inventors: Huanxiang Ruan, Irvine, CA (US); Galvin T. Chia, Rancho Santa Margarita, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/253,491

(22) Filed: Apr. 15, 2014

(51) Int. Cl.
*G11B 11/00* (2006.01)
*G11B 13/04* (2006.01)
*G11B 5/60* (2006.01)
*G11B 5/00* (2006.01)

(52) U.S. Cl.
CPC ............. *G11B 13/04* (2013.01); *G11B 5/607* (2013.01); *G11B 2005/0021* (2013.01)
USPC ................. 369/13.11; 369/13.24; 360/55

(58) Field of Classification Search
None
See application file for complete search history.

(56) References Cited

U.S. PATENT DOCUMENTS

| | | | |
|---|---|---|---|
| 6,018,789 A | 1/2000 | Sokolov et al. | |
| 6,065,095 A | 5/2000 | Sokolov et al. | |
| 6,078,452 A | 6/2000 | Kittilson et al. | |
| 6,081,447 A | 6/2000 | Lofgren et al. | |
| 6,092,149 A | 7/2000 | Hicken et al. | |
| 6,092,150 A | 7/2000 | Sokolov et al. | |
| 6,094,707 A | 7/2000 | Sokolov et al. | |
| 6,105,104 A | 8/2000 | Guttmann et al. | |
| 6,111,717 A | 8/2000 | Cloke et al. | |
| 6,145,052 A | 11/2000 | Howe et al. | |
| 6,175,893 B1 | 1/2001 | D'Souza et al. | |
| 6,178,056 B1 | 1/2001 | Cloke et al. | |
| 6,191,909 B1 | 2/2001 | Cloke et al. | |
| 6,195,218 B1 | 2/2001 | Guttmann et al. | |
| 6,205,494 B1 | 3/2001 | Williams | |
| 6,208,477 B1 | 3/2001 | Cloke et al. | |
| 6,223,303 B1 | 4/2001 | Billings et al. | |
| 6,230,233 B1 | 5/2001 | Lofgren et al. | |
| 6,246,346 B1 | 6/2001 | Cloke et al. | |
| 6,249,393 B1 | 6/2001 | Billings et al. | |
| 6,256,695 B1 | 7/2001 | Williams | |
| 6,262,857 B1 | 7/2001 | Hull et al. | |
| 6,263,459 B1 | 7/2001 | Schibilla | |
| 6,278,568 B1 | 8/2001 | Cloke et al. | |
| 6,279,089 B1 | 8/2001 | Schibilla et al. | |
| 6,289,484 B1 | 9/2001 | Rothberg et al. | |

(Continued)

OTHER PUBLICATIONS

Dean V. Dang, et al., U.S. Appl. No. 13/678,495, filed Nov. 15, 2012, 16 pages.

*Primary Examiner* — Thang Tran

(57) ABSTRACT

A data storage device is disclosed comprising a disk, a head comprising a laser configured to heat the disk while writing data to the disk, and a fly height actuator (FHA) configured to actuate the head vertically over the disk based on an FHA setting. A write laser power applied to the laser during a write operation is calibrated, a first fly height of the head is measured at a first laser power setting, and a second fly height of the head is measured at a second laser power setting different from the first laser power setting. A FHA write setting is generated based on the calibrated write laser power and the first and second fly height measurements, where the FHA write setting is applied to the FHA during the write operation.

20 Claims, 6 Drawing Sheets

(56) References Cited

U.S. PATENT DOCUMENTS

| | | |
|---|---|---|
| 6,292,912 B1 | 9/2001 | Cloke et al. |
| 6,310,740 B1 | 10/2001 | Dunbar et al. |
| 6,317,850 B1 | 11/2001 | Rothberg |
| 6,327,106 B1 | 12/2001 | Rothberg |
| 6,337,778 B1 | 1/2002 | Gagne |
| 6,369,969 B1 | 4/2002 | Christiansen et al. |
| 6,384,999 B1 | 5/2002 | Schibilla |
| 6,388,833 B1 | 5/2002 | Golowka et al. |
| 6,405,342 B1 | 6/2002 | Lee |
| 6,408,357 B1 | 6/2002 | Hanmann et al. |
| 6,408,406 B1 | 6/2002 | Parris |
| 6,411,452 B1 | 6/2002 | Cloke |
| 6,411,458 B1 | 6/2002 | Billings et al. |
| 6,412,083 B1 | 6/2002 | Rothberg et al. |
| 6,415,349 B1 | 7/2002 | Hull et al. |
| 6,425,128 B1 | 7/2002 | Krapf et al. |
| 6,441,981 B1 | 8/2002 | Cloke et al. |
| 6,442,328 B1 | 8/2002 | Elliott et al. |
| 6,445,524 B1 | 9/2002 | Nazarian et al. |
| 6,449,767 B1 | 9/2002 | Krapf et al. |
| 6,453,115 B1 | 9/2002 | Boyle |
| 6,470,420 B1 | 10/2002 | Hospodor |
| 6,480,020 B1 | 11/2002 | Jung et al. |
| 6,480,349 B1 | 11/2002 | Kim et al. |
| 6,480,932 B1 | 11/2002 | Vallis et al. |
| 6,483,986 B1 | 11/2002 | Krapf |
| 6,487,032 B1 | 11/2002 | Cloke et al. |
| 6,490,635 B1 | 12/2002 | Holmes |
| 6,493,173 B1 | 12/2002 | Kim et al. |
| 6,499,083 B1 | 12/2002 | Hamlin |
| 6,519,104 B1 | 2/2003 | Cloke et al. |
| 6,525,892 B1 | 2/2003 | Dunbar et al. |
| 6,545,830 B1 | 4/2003 | Briggs et al. |
| 6,546,489 B1 | 4/2003 | Frank, Jr. et al. |
| 6,550,021 B1 | 4/2003 | Dalphy et al. |
| 6,552,880 B1 | 4/2003 | Dunbar et al. |
| 6,553,457 B1 | 4/2003 | Wilkins et al. |
| 6,578,106 B1 | 6/2003 | Price |
| 6,580,573 B1 | 6/2003 | Hull et al. |
| 6,594,183 B1 | 7/2003 | Lofgren et al. |
| 6,600,620 B1 | 7/2003 | Krounbi et al. |
| 6,601,137 B1 | 7/2003 | Castro et al. |
| 6,603,622 B1 | 8/2003 | Christiansen et al. |
| 6,603,625 B1 | 8/2003 | Hospodor et al. |
| 6,604,220 B1 | 8/2003 | Lee |
| 6,606,682 B1 | 8/2003 | Dang et al. |
| 6,606,714 B1 | 8/2003 | Thelin |
| 6,606,717 B1 | 8/2003 | Yu et al. |
| 6,611,393 B1 | 8/2003 | Nguyen et al. |
| 6,615,312 B1 | 9/2003 | Hamlin et al. |
| 6,639,748 B1 | 10/2003 | Christiansen et al. |
| 6,647,481 B1 | 11/2003 | Luu et al. |
| 6,654,193 B1 | 11/2003 | Thelin |
| 6,657,810 B1 | 12/2003 | Kupferman |
| 6,661,591 B1 | 12/2003 | Rothberg |
| 6,665,772 B1 | 12/2003 | Hamlin |
| 6,687,073 B1 | 2/2004 | Kupferman |
| 6,687,078 B1 | 2/2004 | Kim |
| 6,687,850 B1 | 2/2004 | Rothberg |
| 6,690,523 B1 | 2/2004 | Nguyen et al. |
| 6,690,882 B1 | 2/2004 | Hanmann et al. |
| 6,691,198 B1 | 2/2004 | Hamlin |
| 6,691,213 B1 | 2/2004 | Luu et al. |
| 6,691,255 B1 | 2/2004 | Rothberg et al. |
| 6,693,760 B1 | 2/2004 | Krounbi et al. |
| 6,694,477 B1 | 2/2004 | Lee |
| 6,697,914 B1 | 2/2004 | Hospodor et al. |
| 6,704,153 B1 | 3/2004 | Rothberg et al. |
| 6,708,251 B1 | 3/2004 | Boyle et al. |
| 6,710,951 B1 | 3/2004 | Cloke |
| 6,711,628 B1 | 3/2004 | Thelin |
| 6,711,635 B1 | 3/2004 | Wang |
| 6,711,660 B1 | 3/2004 | Milne et al. |
| 6,715,044 B2 | 3/2004 | Lofgren et al. |
| 6,724,982 B1 | 4/2004 | Hamlin |
| 6,725,329 B1 | 4/2004 | Ng et al. |
| 6,735,650 B1 | 5/2004 | Rothberg |
| 6,735,693 B1 | 5/2004 | Hamlin |
| 6,744,772 B1 | 6/2004 | Eneboe et al. |
| 6,745,283 B1 | 6/2004 | Dang |
| 6,751,402 B1 | 6/2004 | Elliott et al. |
| 6,757,481 B1 | 6/2004 | Nazarian et al. |
| 6,772,281 B2 | 8/2004 | Hamlin |
| 6,781,826 B1 | 8/2004 | Goldstone et al. |
| 6,782,449 B1 | 8/2004 | Codilian et al. |
| 6,791,779 B1 | 9/2004 | Singh et al. |
| 6,792,486 B1 | 9/2004 | Hanan et al. |
| 6,799,274 B1 | 9/2004 | Hamlin |
| 6,811,427 B2 | 11/2004 | Garrett et al. |
| 6,826,003 B1 | 11/2004 | Subrahmanyam |
| 6,826,614 B1 | 11/2004 | Hanmann et al. |
| 6,832,041 B1 | 12/2004 | Boyle |
| 6,832,929 B2 | 12/2004 | Garrett et al. |
| 6,845,405 B1 | 1/2005 | Thelin |
| 6,845,427 B1 | 1/2005 | Atai-Azimi |
| 6,850,443 B2 | 2/2005 | Lofgren et al. |
| 6,851,055 B1 | 2/2005 | Boyle et al. |
| 6,851,063 B1 | 2/2005 | Boyle et al. |
| 6,853,731 B1 | 2/2005 | Boyle et al. |
| 6,854,022 B1 | 2/2005 | Thelin |
| 6,862,660 B1 | 3/2005 | Wilkins et al. |
| 6,880,043 B1 | 4/2005 | Castro et al. |
| 6,882,486 B1 | 4/2005 | Kupferman |
| 6,884,085 B1 | 4/2005 | Goldstone |
| 6,888,831 B1 | 5/2005 | Hospodor et al. |
| 6,892,217 B1 | 5/2005 | Hanmann et al. |
| 6,892,249 B1 | 5/2005 | Codilian et al. |
| 6,892,313 B1 | 5/2005 | Codilian et al. |
| 6,895,455 B1 | 5/2005 | Rothberg |
| 6,895,500 B1 | 5/2005 | Rothberg |
| 6,898,730 B1 | 5/2005 | Hanan |
| 6,910,099 B1 | 6/2005 | Wang et al. |
| 6,928,470 B1 | 8/2005 | Hamlin |
| 6,931,439 B1 | 8/2005 | Hanmann et al. |
| 6,934,104 B1 | 8/2005 | Kupferman |
| 6,934,713 B2 | 8/2005 | Schwartz et al. |
| 6,940,873 B2 | 9/2005 | Boyle et al. |
| 6,943,978 B1 | 9/2005 | Lee |
| 6,948,165 B1 | 9/2005 | Luu et al. |
| 6,950,260 B2 | 9/2005 | Coffey et al. |
| 6,950,267 B1 | 9/2005 | Liu et al. |
| 6,954,733 B1 | 10/2005 | Ellis et al. |
| 6,961,814 B1 | 11/2005 | Thelin et al. |
| 6,965,489 B1 | 11/2005 | Lee et al. |
| 6,965,563 B1 | 11/2005 | Hospodor et al. |
| 6,965,966 B1 | 11/2005 | Rothberg et al. |
| 6,967,799 B1 | 11/2005 | Lee |
| 6,968,422 B1 | 11/2005 | Codilian et al. |
| 6,968,450 B1 | 11/2005 | Rothberg et al. |
| 6,973,495 B1 | 12/2005 | Milne et al. |
| 6,973,570 B1 | 12/2005 | Hamlin |
| 6,975,472 B2 | 12/2005 | Stover et al. |
| 6,976,190 B1 | 12/2005 | Goldstone |
| 6,980,383 B2 | 12/2005 | Brunnett et al. |
| 6,983,316 B1 | 1/2006 | Milne et al. |
| 6,986,007 B1 | 1/2006 | Procyk et al. |
| 6,986,154 B1 | 1/2006 | Price et al. |
| 6,995,933 B1 | 2/2006 | Codilian et al. |
| 6,996,501 B1 | 2/2006 | Rothberg |
| 6,996,669 B1 | 2/2006 | Dang et al. |
| 6,999,256 B2 | 2/2006 | Kim et al. |
| 7,002,926 B1 | 2/2006 | Eneboe et al. |
| 7,003,674 B1 | 2/2006 | Hamlin |
| 7,006,316 B1 | 2/2006 | Sargenti, Jr. et al. |
| 7,009,820 B1 | 3/2006 | Hogg |
| 7,023,639 B1 | 4/2006 | Kupferman |
| 7,024,491 B1 | 4/2006 | Hanmann et al. |
| 7,024,549 B1 | 4/2006 | Luu et al. |
| 7,024,614 B1 | 4/2006 | Thelin et al. |
| 7,027,242 B1 | 4/2006 | Terrill et al. |
| 7,027,716 B1 | 4/2006 | Boyle et al. |
| 7,028,174 B1 | 4/2006 | Atai-Azimi et al. |
| 7,031,902 B1 | 4/2006 | Catiller |
| 7,046,465 B1 | 5/2006 | Kupferman |

(56) References Cited

U.S. PATENT DOCUMENTS

| | | |
|---|---|---|
| 7,046,488 B1 | 5/2006 | Hogg |
| 7,050,252 B1 | 5/2006 | Vallis |
| 7,054,937 B1 | 5/2006 | Milne et al. |
| 7,055,000 B1 | 5/2006 | Severtson |
| 7,055,167 B1 | 5/2006 | Masters |
| 7,057,836 B1 | 6/2006 | Kupferman |
| 7,062,398 B1 | 6/2006 | Rothberg |
| 7,075,746 B1 | 7/2006 | Kupferman |
| 7,076,604 B1 | 7/2006 | Thelin |
| 7,082,494 B1 | 7/2006 | Thelin et al. |
| 7,088,538 B1 | 8/2006 | Codilian et al. |
| 7,088,545 B1 | 8/2006 | Singh et al. |
| 7,092,186 B1 | 8/2006 | Hogg |
| 7,095,577 B1 | 8/2006 | Codilian et al. |
| 7,099,095 B1 | 8/2006 | Subrahmanyam et al. |
| 7,099,097 B2 | 8/2006 | Hamaguchi et al. |
| 7,106,537 B1 | 9/2006 | Bennett |
| 7,106,947 B2 | 9/2006 | Boyle et al. |
| 7,110,202 B1 | 9/2006 | Vasquez |
| 7,111,116 B1 | 9/2006 | Boyle et al. |
| 7,114,029 B1 | 9/2006 | Thelin |
| 7,120,737 B1 | 10/2006 | Thelin |
| 7,120,806 B1 | 10/2006 | Codilian et al. |
| 7,126,776 B1 | 10/2006 | Warren, Jr. et al. |
| 7,129,763 B1 | 10/2006 | Bennett et al. |
| 7,133,600 B1 | 11/2006 | Boyle |
| 7,136,244 B1 | 11/2006 | Rothberg |
| 7,146,094 B1 | 12/2006 | Boyle |
| 7,149,046 B1 | 12/2006 | Coker et al. |
| 7,150,036 B1 | 12/2006 | Milne et al. |
| 7,155,616 B1 | 12/2006 | Hamlin |
| 7,171,108 B1 | 1/2007 | Masters et al. |
| 7,171,110 B1 | 1/2007 | Wilshire |
| 7,194,576 B1 | 3/2007 | Boyle |
| 7,200,698 B1 | 4/2007 | Rothberg |
| 7,205,805 B1 | 4/2007 | Bennett |
| 7,206,497 B1 | 4/2007 | Boyle et al. |
| 7,215,496 B1 | 5/2007 | Kupferman et al. |
| 7,215,771 B1 | 5/2007 | Hamlin |
| 7,230,780 B2 | 6/2007 | Suk |
| 7,237,054 B1 | 6/2007 | Cain et al. |
| 7,240,161 B1 | 7/2007 | Boyle |
| 7,249,365 B1 | 7/2007 | Price et al. |
| 7,263,709 B1 | 8/2007 | Krapf |
| 7,274,639 B1 | 9/2007 | Codilian et al. |
| 7,274,659 B2 | 9/2007 | Hospodor |
| 7,275,116 B1 | 9/2007 | Hanmann et al. |
| 7,280,302 B1 | 10/2007 | Masiewicz |
| 7,292,774 B1 | 11/2007 | Masters et al. |
| 7,292,775 B1 | 11/2007 | Boyle et al. |
| 7,296,284 B1 | 11/2007 | Price et al. |
| 7,302,501 B1 | 11/2007 | Cain et al. |
| 7,302,579 B1 | 11/2007 | Cain et al. |
| 7,318,088 B1 | 1/2008 | Mann |
| 7,319,806 B1 | 1/2008 | Willner et al. |
| 7,324,306 B2 | 1/2008 | Ruiz |
| 7,325,244 B2 | 1/2008 | Boyle et al. |
| 7,330,323 B1 | 2/2008 | Singh et al. |
| 7,330,324 B2 | 2/2008 | Morinaga et al. |
| 7,346,790 B1 | 3/2008 | Klein |
| 7,366,641 B1 | 4/2008 | Masiewicz et al. |
| 7,369,340 B1 | 5/2008 | Dang et al. |
| 7,369,343 B1 | 5/2008 | Yeo et al. |
| 7,372,650 B1 | 5/2008 | Kupferman |
| 7,380,147 B1 | 5/2008 | Sun |
| 7,392,340 B1 | 6/2008 | Dang et al. |
| 7,404,013 B1 | 7/2008 | Masiewicz |
| 7,406,545 B1 | 7/2008 | Rothberg et al. |
| 7,415,571 B1 | 8/2008 | Hanan |
| 7,436,610 B1 | 10/2008 | Thelin |
| 7,436,620 B1 | 10/2008 | Kang et al. |
| 7,437,502 B1 | 10/2008 | Coker |
| 7,440,214 B1 | 10/2008 | Ell et al. |
| 7,451,344 B1 | 11/2008 | Rothberg |
| 7,471,483 B1 | 12/2008 | Ferris et al. |
| 7,471,486 B1 | 12/2008 | Coker et al. |
| 7,486,060 B1 | 2/2009 | Bennett |
| 7,486,459 B1 | 2/2009 | Schreck et al. |
| 7,496,493 B1 | 2/2009 | Stevens |
| 7,518,819 B1 | 4/2009 | Yu et al. |
| 7,526,184 B1 | 4/2009 | Parkinen et al. |
| 7,539,924 B1 | 5/2009 | Vasquez et al. |
| 7,543,117 B1 | 6/2009 | Hanan |
| 7,551,383 B1 | 6/2009 | Kupferman |
| 7,562,282 B1 | 7/2009 | Rothberg |
| 7,577,973 B1 | 8/2009 | Kapner, III et al. |
| 7,596,797 B1 | 9/2009 | Kapner, III et al. |
| 7,599,139 B1 | 10/2009 | Bombet et al. |
| 7,619,841 B1 | 11/2009 | Kupferman |
| 7,647,544 B1 | 1/2010 | Masiewicz |
| 7,649,704 B1 | 1/2010 | Bombet et al. |
| 7,653,927 B1 | 1/2010 | Kapner, III et al. |
| 7,656,603 B1 | 2/2010 | Xing |
| 7,656,763 B1 | 2/2010 | Jin et al. |
| 7,657,149 B2 | 2/2010 | Boyle |
| 7,672,072 B1 | 3/2010 | Boyle et al. |
| 7,673,075 B1 | 3/2010 | Masiewicz |
| 7,688,540 B1 | 3/2010 | Mei et al. |
| 7,701,676 B2 | 4/2010 | Kubotera et al. |
| 7,724,461 B1 | 5/2010 | McFadyen et al. |
| 7,725,584 B1 | 5/2010 | Hanmann et al. |
| 7,730,295 B1 | 6/2010 | Lee |
| 7,760,458 B1 | 7/2010 | Trinh |
| 7,768,776 B1 | 8/2010 | Szeremeta et al. |
| 7,804,657 B1 | 9/2010 | Hogg et al. |
| 7,813,954 B1 | 10/2010 | Price et al. |
| 7,827,320 B1 | 11/2010 | Stevens |
| 7,839,588 B1 | 11/2010 | Dang et al. |
| 7,843,660 B1 | 11/2010 | Yeo |
| 7,852,596 B2 | 12/2010 | Boyle et al. |
| 7,859,782 B1 | 12/2010 | Lee |
| 7,872,822 B1 | 1/2011 | Rothberg |
| 7,898,756 B1 | 3/2011 | Wang |
| 7,898,762 B1 | 3/2011 | Guo et al. |
| 7,900,037 B1 | 3/2011 | Fallone et al. |
| 7,907,364 B2 | 3/2011 | Boyle et al. |
| 7,929,234 B1 | 4/2011 | Boyle et al. |
| 7,933,087 B1 | 4/2011 | Tsai et al. |
| 7,933,090 B1 | 4/2011 | Jung et al. |
| 7,934,030 B1 | 4/2011 | Sargenti, Jr. et al. |
| 7,940,491 B2 | 5/2011 | Szeremeta et al. |
| 7,944,639 B1 | 5/2011 | Wang |
| 7,945,727 B2 | 5/2011 | Rothberg et al. |
| 7,974,029 B2 | 7/2011 | Tsai et al. |
| 7,974,039 B1 | 7/2011 | Xu et al. |
| 7,982,993 B1 | 7/2011 | Tsai et al. |
| 7,984,200 B1 | 7/2011 | Bombet et al. |
| 7,990,647 B2 | 8/2011 | Lille |
| 7,990,648 B1 | 8/2011 | Wang |
| 7,992,179 B1 | 8/2011 | Kapner, Iii et al. |
| 7,995,425 B2 | 8/2011 | Schreck et al. |
| 8,004,785 B1 | 8/2011 | Tsai et al. |
| 8,006,027 B1 | 8/2011 | Stevens et al. |
| 8,014,094 B1 | 9/2011 | Jin |
| 8,014,977 B1 | 9/2011 | Masiewicz et al. |
| 8,019,914 B1 | 9/2011 | Vasquez et al. |
| 8,040,625 B1 | 10/2011 | Boyle et al. |
| 8,078,943 B1 | 12/2011 | Lee |
| 8,079,045 B2 | 12/2011 | Krapf et al. |
| 8,082,433 B1 | 12/2011 | Fallone et al. |
| 8,085,487 B1 | 12/2011 | Jung et al. |
| 8,089,719 B1 | 1/2012 | Dakroub |
| 8,090,902 B1 | 1/2012 | Bennett et al. |
| 8,090,906 B1 | 1/2012 | Blaha et al. |
| 8,091,112 B1 | 1/2012 | Elliott et al. |
| 8,094,396 B1 | 1/2012 | Zhang et al. |
| 8,094,401 B1 | 1/2012 | Peng et al. |
| 8,116,020 B1 | 2/2012 | Lee |
| 8,116,025 B1 | 2/2012 | Chan et al. |
| 8,134,793 B1 | 3/2012 | Vasquez et al. |
| 8,134,798 B1 | 3/2012 | Thelin et al. |
| 8,139,301 B1 | 3/2012 | Li et al. |
| 8,139,310 B1 | 3/2012 | Hogg |
| 8,144,419 B1 | 3/2012 | Liu |

(56) References Cited

U.S. PATENT DOCUMENTS

| | | |
|---|---|---|
| 8,145,452 B1 | 3/2012 | Masiewicz et al. |
| 8,149,528 B1 | 4/2012 | Suratman et al. |
| 8,154,812 B1 | 4/2012 | Boyle et al. |
| 8,159,768 B1 | 4/2012 | Miyamura |
| 8,161,328 B1 | 4/2012 | Wilshire |
| 8,164,849 B1 | 4/2012 | Szeremeta et al. |
| 8,174,780 B1 | 5/2012 | Tsai et al. |
| 8,190,575 B1 | 5/2012 | Ong et al. |
| 8,194,338 B1 | 6/2012 | Zhang |
| 8,194,340 B1 | 6/2012 | Boyle et al. |
| 8,194,341 B1 | 6/2012 | Boyle |
| 8,201,066 B1 | 6/2012 | Wang |
| 8,271,692 B1 | 9/2012 | Dinh et al. |
| 8,279,550 B1 | 10/2012 | Hogg |
| 8,281,218 B1 | 10/2012 | Ybarra et al. |
| 8,285,923 B2 | 10/2012 | Stevens |
| 8,289,656 B1 | 10/2012 | Huber |
| 8,305,705 B1 | 11/2012 | Roohr |
| 8,307,156 B1 | 11/2012 | Codilian et al. |
| 8,310,775 B1 | 11/2012 | Boguslawski et al. |
| 8,315,006 B1 | 11/2012 | Chahwan et al. |
| 8,316,263 B1 | 11/2012 | Gough et al. |
| 8,320,067 B1 | 11/2012 | Tsai et al. |
| 8,324,974 B1 | 12/2012 | Bennett |
| 8,332,695 B2 | 12/2012 | Dalphy et al. |
| 8,339,919 B1 | 12/2012 | Lee |
| 8,341,337 B1 | 12/2012 | Ong et al. |
| 8,350,628 B1 | 1/2013 | Bennett |
| 8,356,184 B1 | 1/2013 | Meyer et al. |
| 8,370,683 B1 | 2/2013 | Ryan et al. |
| 8,375,225 B1 | 2/2013 | Ybarra |
| 8,375,274 B1 | 2/2013 | Bonke |
| 8,380,922 B1 | 2/2013 | Deforest et al. |
| 8,390,948 B2 | 3/2013 | Hogg |
| 8,390,952 B1 | 3/2013 | Szeremeta |
| 8,392,689 B1 | 3/2013 | Lott |
| 8,407,393 B1 | 3/2013 | Yolar et al. |
| 8,413,010 B1 | 4/2013 | Vasquez et al. |
| 8,417,566 B2 | 4/2013 | Price et al. |
| 8,421,663 B1 | 4/2013 | Bennett |
| 8,422,172 B1 | 4/2013 | Dakroub et al. |
| 8,427,770 B1 | 4/2013 | O'Dell et al. |
| 8,427,771 B1 | 4/2013 | Tsai |
| 8,429,343 B1 | 4/2013 | Tsai |
| 8,433,937 B1 | 4/2013 | Wheelock et al. |
| 8,433,977 B1 | 4/2013 | Vasquez et al. |
| 8,441,909 B1 * | 5/2013 | Thayamballi et al. .......... 360/59 |
| 8,456,643 B2 | 6/2013 | Prabhakaran et al. |
| 8,456,980 B1 * | 6/2013 | Thayamballi ................... 360/59 |
| 8,458,526 B2 | 6/2013 | Dalphy et al. |
| 8,462,466 B2 | 6/2013 | Huber |
| 8,467,151 B1 | 6/2013 | Huber |
| 8,483,027 B1 | 7/2013 | Mak et al. |
| 8,489,841 B1 | 7/2013 | Strecke et al. |
| 8,493,679 B1 | 7/2013 | Boguslawski et al. |
| 8,499,198 B1 | 7/2013 | Messenger et al. |
| 8,514,506 B1 | 8/2013 | Li et al. |
| 8,554,741 B1 | 10/2013 | Malina |
| 8,560,759 B1 | 10/2013 | Boyle et al. |
| 8,576,509 B1 | 11/2013 | Hogg |
| 8,576,511 B1 | 11/2013 | Coker et al. |
| 8,578,100 B1 | 11/2013 | Huynh et al. |
| 8,578,242 B1 | 11/2013 | Burton et al. |
| 8,582,223 B1 | 11/2013 | Garani et al. |
| 8,582,231 B1 | 11/2013 | Kermiche et al. |
| 8,589,773 B1 | 11/2013 | Wang et al. |
| 8,593,753 B1 | 11/2013 | Anderson |
| 8,599,512 B2 | 12/2013 | Hogg |
| 8,605,379 B1 | 12/2013 | Sun |
| 8,611,031 B1 | 12/2013 | Tan et al. |
| 8,611,032 B2 | 12/2013 | Champion et al. |
| 8,612,798 B1 | 12/2013 | Tsai |
| 8,619,383 B1 | 12/2013 | Jung et al. |
| 8,619,508 B1 * | 12/2013 | Krichevsky et al. ....... 369/13.11 |
| 8,619,529 B1 | 12/2013 | Liew et al. |
| 8,621,115 B1 | 12/2013 | Bombet et al. |
| 8,621,133 B1 | 12/2013 | Boyle |
| 8,625,224 B1 | 1/2014 | Lin et al. |
| 8,625,225 B1 | 1/2014 | Wang |
| 8,626,463 B2 | 1/2014 | Stevens et al. |
| 8,630,052 B1 | 1/2014 | Jung et al. |
| 8,631,188 B1 | 1/2014 | Heath et al. |
| 8,635,412 B1 | 1/2014 | Wilshire |
| 8,661,193 B1 | 2/2014 | Cobos et al. |
| 8,665,547 B1 | 3/2014 | Yeo et al. |
| 8,667,248 B1 | 3/2014 | Neppalli |
| 8,670,205 B1 | 3/2014 | Malina et al. |
| 8,671,250 B2 | 3/2014 | Lee |
| 8,681,442 B2 | 3/2014 | Hogg |
| 8,681,445 B1 | 3/2014 | Kermiche et al. |
| 8,683,295 B1 | 3/2014 | Syu et al. |
| 8,687,306 B1 | 4/2014 | Coker et al. |
| 8,687,307 B1 | 4/2014 | Patton, III |
| 8,687,313 B2 | 4/2014 | Selvaraj |
| 8,693,133 B1 | 4/2014 | Lee et al. |
| 8,698,492 B1 | 4/2014 | Mak et al. |
| 8,699,171 B1 | 4/2014 | Boyle |
| 8,699,172 B1 | 4/2014 | Gunderson et al. |
| 8,711,500 B1 | 4/2014 | Fong et al. |
| 8,711,506 B1 | 4/2014 | Giovenzana et al. |
| 8,711,665 B1 | 4/2014 | Abdul Hamid |
| 8,717,694 B1 | 5/2014 | Liew et al. |
| 8,717,695 B1 | 5/2014 | Lin et al. |
| 8,730,612 B1 | 5/2014 | Haralson |
| 8,743,502 B1 | 6/2014 | Bonke et al. |
| 8,749,911 B1 | 6/2014 | Sun et al. |
| 8,753,146 B1 | 6/2014 | Szeremeta et al. |
| 8,755,136 B1 | 6/2014 | Ng et al. |
| 8,756,361 B1 | 6/2014 | Carlson et al. |
| 8,760,782 B1 | 6/2014 | Garani et al. |
| 8,760,792 B1 | 6/2014 | Tam |
| 8,769,593 B1 | 7/2014 | Schwartz et al. |
| 8,773,793 B1 | 7/2014 | Mcfadyen |
| 8,773,802 B1 | 7/2014 | Anderson et al. |
| 8,773,807 B1 | 7/2014 | Chia et al. |
| 8,773,957 B1 | 7/2014 | Champion et al. |
| 8,780,470 B1 | 7/2014 | Wang et al. |
| 8,782,334 B1 | 7/2014 | Boyle et al. |
| 8,786,976 B1 | 7/2014 | Kang et al. |
| 8,787,125 B1 | 7/2014 | Lee |
| 8,792,196 B1 | 7/2014 | Lee |
| 8,792,200 B1 | 7/2014 | Tam et al. |
| 8,797,667 B1 | 8/2014 | Barlow et al. |
| 8,799,977 B1 | 8/2014 | Kapner, III et al. |
| 8,817,413 B1 | 8/2014 | Knigge et al. |
| 8,817,584 B1 | 8/2014 | Selvaraj |
| 8,825,976 B1 | 9/2014 | Jones |
| 8,825,977 B1 | 9/2014 | Syu et al. |
| 2007/0230012 A1 | 10/2007 | Erden et al. |
| 2007/0230021 A1 | 10/2007 | Schreck et al. |
| 2009/0113702 A1 | 5/2009 | Hogg |
| 2009/0185307 A1 | 7/2009 | Roth |
| 2009/0207519 A1 | 8/2009 | Erden et al. |
| 2009/0268335 A1 | 10/2009 | Huang et al. |
| 2009/0323079 A1 * | 12/2009 | Lui et al. ...................... 356/507 |
| 2010/0123967 A1 | 5/2010 | Batra et al. |
| 2010/0306551 A1 | 12/2010 | Meyer et al. |
| 2011/0226729 A1 | 9/2011 | Hogg |
| 2012/0159042 A1 | 6/2012 | Lott et al. |
| 2012/0275050 A1 | 11/2012 | Wilson et al. |
| 2012/0281963 A1 | 11/2012 | Krapf et al. |
| 2012/0324980 A1 | 12/2012 | Nguyen et al. |
| 2013/0094104 A1 | 4/2013 | Ngan et al. |

* cited by examiner

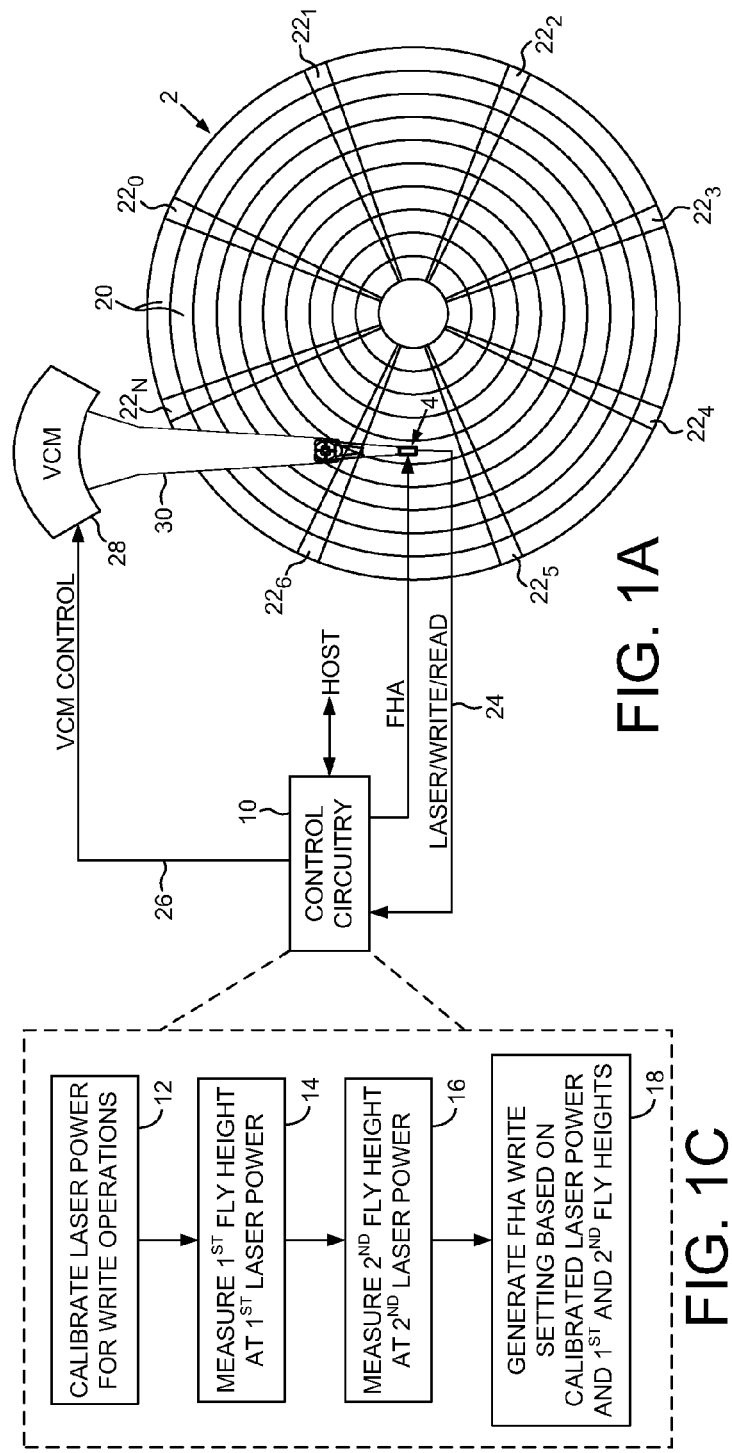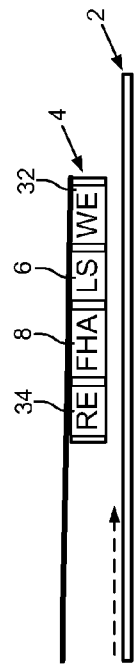

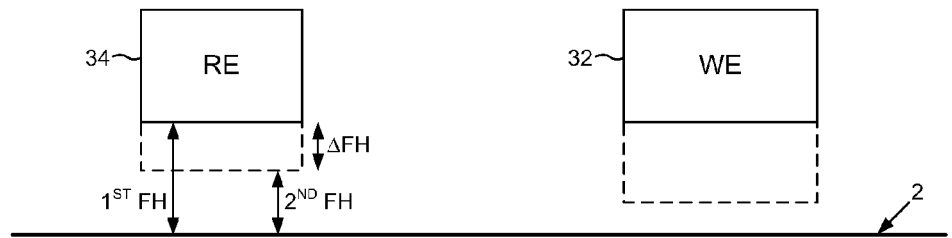
FIG. 4A
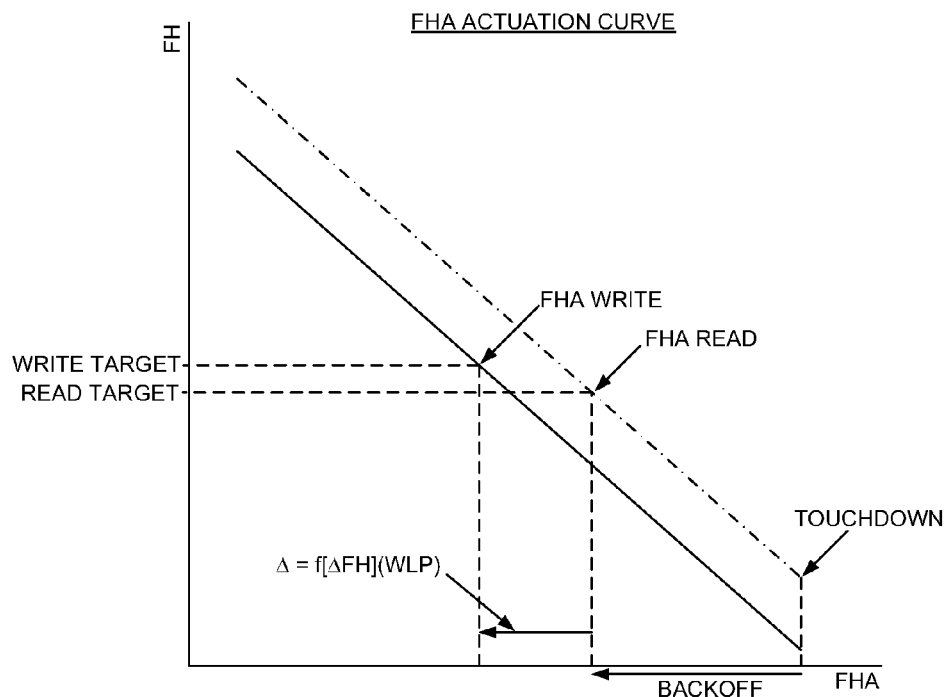
FIG. 4B
| ΔFH_1 | f(WLP)_1 |
| ΔFH_2 | f(WLP)_2 |
| ΔFH_3 | f(WLP)_3 |
| ΔFH_4 | f(WLP)_4 |
| ΔFH_5 | f(WLP)_5 |
| ΔFH_N | f(WLP)_N |
FIG. 4C

DATA STORAGE DEVICE CALIBRATING FLY HEIGHT ACTUATOR BASED ON LASER POWER FOR HEAT ASSISTED MAGNETIC RECORDING

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a servo controller to control the velocity of the actuator arm as it seeks from track to track.

Data is typically written to the disk by modulating a write current in an inductive coil to record magnetic transitions onto the disk surface in a process referred to as saturation recording. During readback, the magnetic transitions are sensed by a read element (e.g., a magnetoresistive element) and the resulting read signal demodulated by a suitable read channel. Heat assisted magnetic recording (HAMR) is a recent development that improves the quality of written data by heating the disk surface with a laser during write operations in order to decrease the coercivity of the magnetic medium, thereby enabling the magnetic field generated by the write coil to more readily magnetize the disk surface.

Since the quality of the write/read signal depends on the fly height of the head, conventional heads may comprise an actuator for controlling the fly height. Any suitable dynamic fly height (DFH) actuator may be employed, such as a heater which controls fly height through thermal expansion, or a piezoelectric (PZT) actuator. It is desirable to determine the appropriate DFH setting (e.g., appropriate current applied to a heater) that achieves the target fly height for the head.

BRIEF DESCRIPTION OF THE DRAWINGS

FIGS. 1A and 1B shows a data storage device in the form of a disk drive comprising a disk, a head comprising a laser configured to heat the disk while writing data to the disk, and a fly height actuator (FHA) configured to actuate the head vertically over the disk based on an FHA setting.

FIG. 1C is a flow diagram according to an embodiment wherein a FHA write setting is generated based on a calibrated write laser power and first and second fly height measurements.

FIG. 4A shows an embodiment wherein a fly height is measured at two different laser power settings to generate a delta fly height.

FIG. 4B shows an embodiment for generating the FHA write setting based on the calibrated write laser power and the delta fly height.

FIG. 4C shows an embodiment where a number of curve fitted functions each corresponding to a particular delta fly height are stored in a table which is then indexed by the measured delta fly height for a particular disk drive.

DETAILED DESCRIPTION

Figure 2:
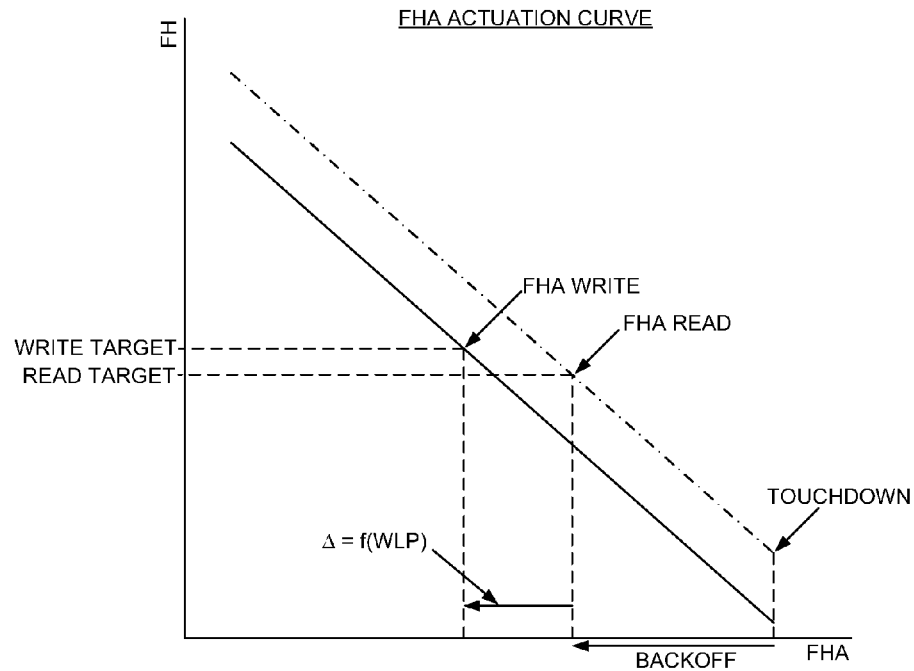
FIG. 2 shows an embodiment for generating the FHA write setting based on the calibrated write laser power.

FIG. 1A shows a data storage device in the form of a disk drive according to an embodiment comprising a disk 2, a head 4 (FIG. 1B) comprising a laser 6 configured to heat the disk 2 while writing data to the disk 2, and a fly height actuator (FHA) 8 configured to actuate the head 4 vertically over the disk 2 based on an FHA setting. The disk drive further comprises control circuitry 10 configured to execute the flow diagram of FIG. 1C, wherein a write laser power applied to the laser during a write operation is calibrated (block 12), a first fly height of the head is measured at a first laser power setting (block 14), and a second fly height of the head is measured at a second laser power setting different from the first laser power setting (block 16). A FHA write setting is generated based on the calibrated write laser power and the first and second fly height measurements (block 18), where the FHA write setting is applied to the FHA during the write operation.

In the embodiment of FIG. 1A, the disk 2 comprises a plurality of servo tracks 20 defined by servo sectors $22_0$-$22_N$, wherein data tracks are defined relative to the servo tracks at the same or different radial density. The control circuitry 10 processes a read signal 24 emanating from the head 4 to demodulate the servo sectors $22_0$-$22_N$ and generate a position error signal (PES) representing an error between the actual position of the head and a target position relative to a target track. The control circuitry 10 filters the PES using a suitable compensation filter to generate a control signal 26 applied to a voice coil motor (VCM) 28 which rotates an actuator arm 30 about a pivot in order to actuate the head 4 radially over the disk 2 in a direction that reduces the PES. The servo sectors $22_0$-$22_N$ may comprise any suitable head position information, such as a track address for coarse positioning and servo bursts for fine positioning. The servo bursts may comprise any suitable pattern, such as an amplitude based servo pattern or a phase based servo pattern.

In the embodiment of FIG. 1B, the head 4 comprises a suitable write element 32, such as an inductive coil, and a suitable read element 34, such as a magnetoresistive element. The head 4 may comprise any suitable laser 6 for heating the disk 2, such as a laser diode, as well as any suitable optics for focusing the light emitted by the laser 6 onto the disk, such as a waveguide and a near field transducer (NFT). In addition, any suitable FHA 8 may be employed, such as a heater that actuates through thermal expansion, or a piezoelectric actuator that actuates through mechanical deflection.

In one embodiment, a laser power applied to the laser 6 during a write operation is calibrated to achieve optimal recording reliability. For example, if the laser power is too low it may result in under saturation of the magnetic media, and if the laser power is too high, it may cause erasure of data recorded in adjacent data tracks. In one embodiment, the calibration procedure involves writing a test pattern to the disk 2 and evaluating a suitable quality metric while reading the test pattern. This process is repeated at different laser powers until the quality metric exceeds a threshold.

Since the fly height of the head also affects the quality of the recorded data, and since the heating effect of the laser 6 on the head 4 decreases the fly height, in one embodiment an FHA write setting is generated based on the calibrated write laser power. FIG. 2 illustrates an embodiment for generating the FHA write setting based on the calibrated write laser power. In this embodiment, the laser power is set to zero (or near zero) so that the write components do not protrude toward the disk 2. The FHA setting is increased from an initial value until a touchdown of the head 4 onto the disk 2 is detected. In one embodiment, a fly height measurement is also generated at each incremental FHA setting in order to generate an FHA actuation curve as shown in FIG. 2. Once touchdown has been detected, the FHA setting is decreased by a backoff value that corresponds to a target fly height during read operations (FHA read setting). In one embodiment, the fly height measurement in the FHA actuation curve that corresponds to the FHA read setting as shown in FIG. 2 becomes a target fly height of a closed-loop feedback system that controls the fly height of the head during read operations.

FIG. 2 also illustrates how the entire actuation curve will decrease by an offset (from the dashed line to the solid line) during write operations due to the heating effect of the laser 6. In order to compensate for this heating effect, the FHA setting is decreased (from the FHA read setting) by a delta based on the calibrated write laser power (WLP) to generate a corresponding FHA write setting as shown in FIG. 2. In one embodiment, the fly height measurement in the FHA actuation curve that corresponds to the FHA write setting becomes a target fly height of a closed-loop feedback system that controls the fly height of the head during write operations. In the example shown in FIG. 2, the fly height target for write operations is higher than the fly height target for read operations due to the fly height offset between the write element 32 and the read element 34. That is, during write operations the write element 32 may fly lower than the read element 34 due to the heating effect of the laser 6 as shown in FIG. 4A. If the fly height of the head is measured relative to the read element 34 (e.g., by reading a periodic pattern from the disk), the higher write fly height target compensates for the fly height offset between the write element 32 and the read element 34. In another embodiment, the fly height of the head may be controlled by applying the FHA write setting shown in FIG. 2 to the FHA 8 using an open-loop control system during write operations.

Figure 3:
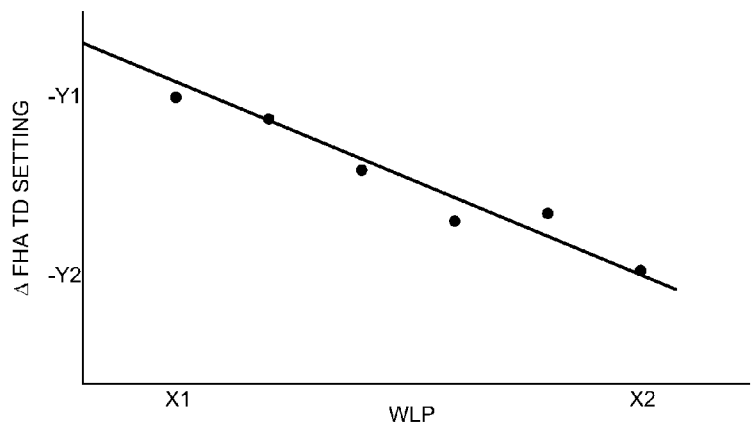
FIG. 3 shows an embodiment wherein a decrease in FHA touchdown settings relative to the write laser power are fitted to a curve (e.g., a line) that may be represented by a polynomial.

The delta for decreasing the FHA setting as shown in FIG. 2 may be generated based on the calibrated write laser power in any suitable manner. In one embodiment illustrated in FIG. 3, the touchdown calibration procedure described above may be performed over a range of laser power settings (X1 to X2) and a corresponding decrement in the FHA touchdown setting (−Y1 to −Y2) determined. That is, for each incremental increase in laser power there will be a corresponding decrease in the FHA setting that causes a touchdown event. In one embodiment, the decrease in the FHA touchdown settings relative to the write laser power as shown in FIG. 3 are fitted to a curve (e.g., a line) that may be represented by a polynomial. The delta in the FHA touchdown setting may then be computed as a function of the write laser power, and in one embodiment the delta in the FHA touchdown setting may be used to generate the delta for the FHA write setting shown in FIG. 2. In one embodiment, the range evaluated from X1 to X2 for the WLP settings in FIG. 3 spans the calibrated values that may be employed in each production disk drive (e.g., WLP settings near zero may be ignored since they are not used in a production disk drive and may also exhibit a non-linear relationship with the delta in the FHA touchdown setting).

In one embodiment, applying power to the laser while executing a touchdown operation may damage one or more write components (e.g., the NFT) due to the thermal protrusion of the components toward the disk. Accordingly, in one embodiment the touchdown operation may be executed for a non-production disk drive in order to generate the data points and resulting curve fitted function shown in FIG. 3. The curve fitted function may then be loaded into each production disk drive so that the delta in the FHA write setting may be computed using the function without having to execute a touchdown operation. However, in one embodiment the curve fitted function shown in FIG. 3 may not be an accurate representation for all production disk drives due to manufacturing tolerances when fabricating the heads. For production disk drives where the curve fitted function of FIG. 3 is not an accurate representation, the error in the FHA write setting may degrade the performance of the write operations. Accordingly, in one embodiment a more accurate representation of the curve fitted function of FIG. 3 (or an equivalent thereof) is estimated for each production disk drive while still avoiding the need to execute the touchdown procedure that may damage the write components.

FIG. 4A illustrates an example of this embodiment wherein a delta fly height ($\Delta FH$) measurement is generated based on two laser power settings in order to characterize how the laser power affects the fly height. This $\Delta FH$ will vary across disk drives depending on the variances in the fabrication of each head. In one embodiment, the data points shown in FIG. 3 are measured for a plurality of non-production disk drives having a range of different $\Delta FH$ measurements. In this manner a plurality of curve fitted functions may be generated each corresponding to a different $\Delta FH$, wherein the curve fitted functions may be stored in a table as shown in FIG. 4C and loaded into each production disk drive. Each production disk drive may then measure the $\Delta FH$ for the particular installed head(s), and then generate the delta FHA write setting as shown in FIG. 4B based on the calibrate write laser power (WLP) as well as the function (e.g., in FIG. 4C) corresponding to the $\Delta FH$ measured for the production disk drive.

Figure 5:
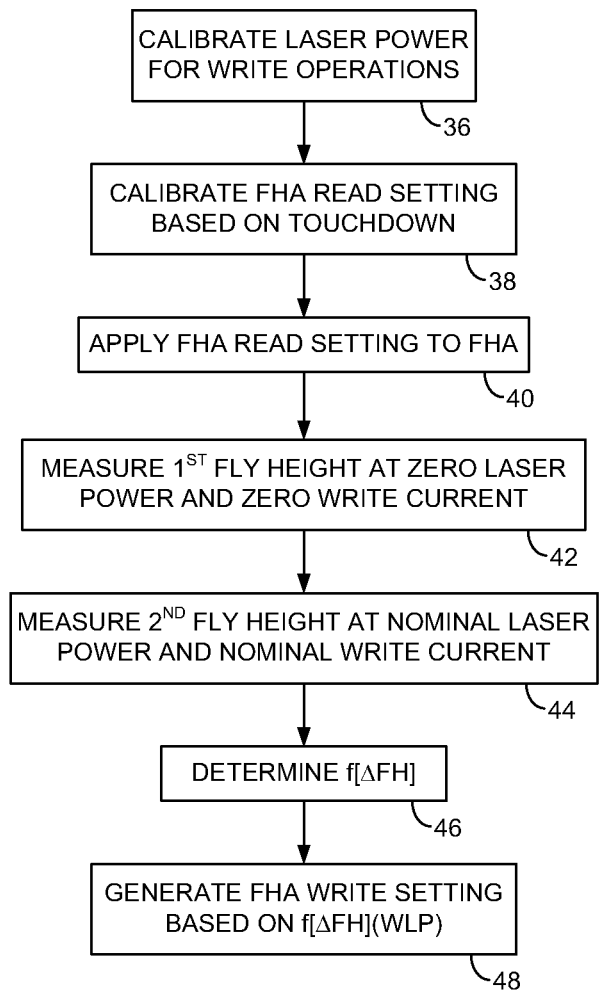
FIG. 5 is a flow diagram wherein a first fly height measured at zero laser power and a second fly height is measured at a nominal laser power in order to generate the delta fly height.

FIG. 5 is a flow diagram according to an embodiment wherein the write laser power for a production disk drive is calibrated (block 36), and an FHA read setting is calibrated by executing a touchdown operation (block 38). In one embodiment, the FHA read setting corresponds to a substantially zero laser power (and zero write current) and therefore there is essentially no damage to the write components due to thermal protrusion when executing the touchdown operation. While applying the FHA read setting to the FHA (block 40), a first fly height of the head is measured at zero laser power and zero write current (block 42), and then a second fly height of the head is measured at a nominal laser power and a nominal write current (block 44). In one embodiment, the nominal laser power and nominal write current are selected so as to ensure the write components of the head will not contact the disk. A delta fly height ($\Delta FH$) measurement and corresponding function is generated (block 46) based on a difference between the first and second fly height measurements such as shown in FIG. 4A. An FHA write setting is then generated based on the calibrated write laser power (WLP) and the $\Delta FH$ (block 48) such as illustrated in FIG. 4B.

Figure 6:
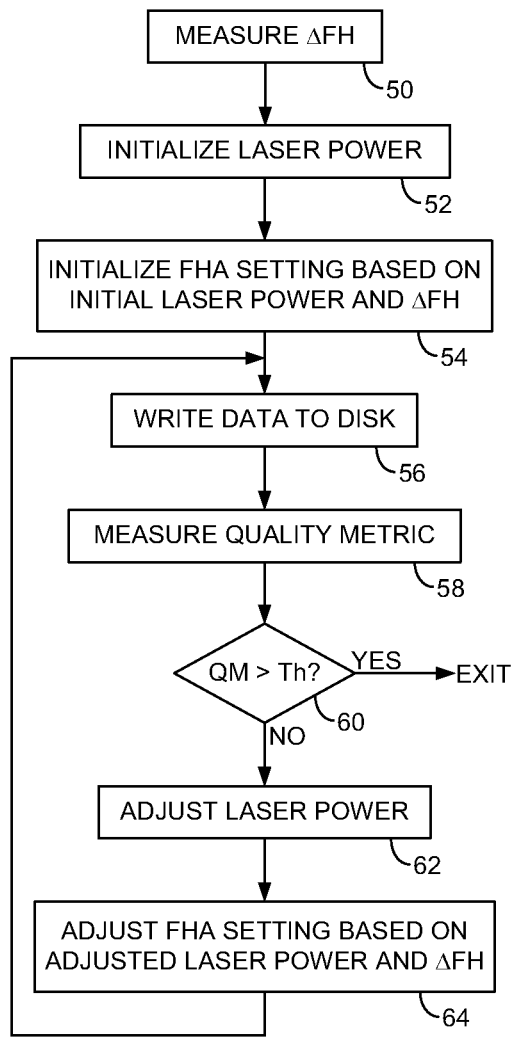
FIG. 6 is a flow diagram according to an embodiment wherein the FHA write setting is adjusted to maintain a substantially constant fly height when calibrating the write laser power.

In one embodiment, the FHA write setting may be adjusted when calibrating the laser power. This embodiment is understood with reference to the flow diagram of FIG. 6 wherein after measuring the ΔFH for a production disk drive (block 50), the laser power is initialized, for example, to a low setting (block 52), and the FHA write setting is initialized based on the initial laser power (block 54). That is, the delta for the FHA write setting shown in FIG. 4B is generated based on the initial laser power and the measured ΔFH. Data is then written to the disk (block 56) and a quality metric of the write operation is generated (block 58) such as by measuring an off-track read capability. If the quality metric indicates a poor write quality (e.g., if the quality metric is less than a threshold at block 60), then the laser power is adjusted, for example, increased (block 62), and the FHA write setting is adjusted based on the adjusted laser power and the measured ΔFH (block 64). The flow diagram is then repeated from block 56 until the quality metric indicates a good write quality (e.g., until the quality metric is greater than the threshold at block 60). In this manner, the laser power is calibrated by evaluating the write quality at different laser power settings while maintaining a substantially constant fly height by making an appropriate adjustment to the FHA write setting as the laser power is adjusted.

Figure 7:
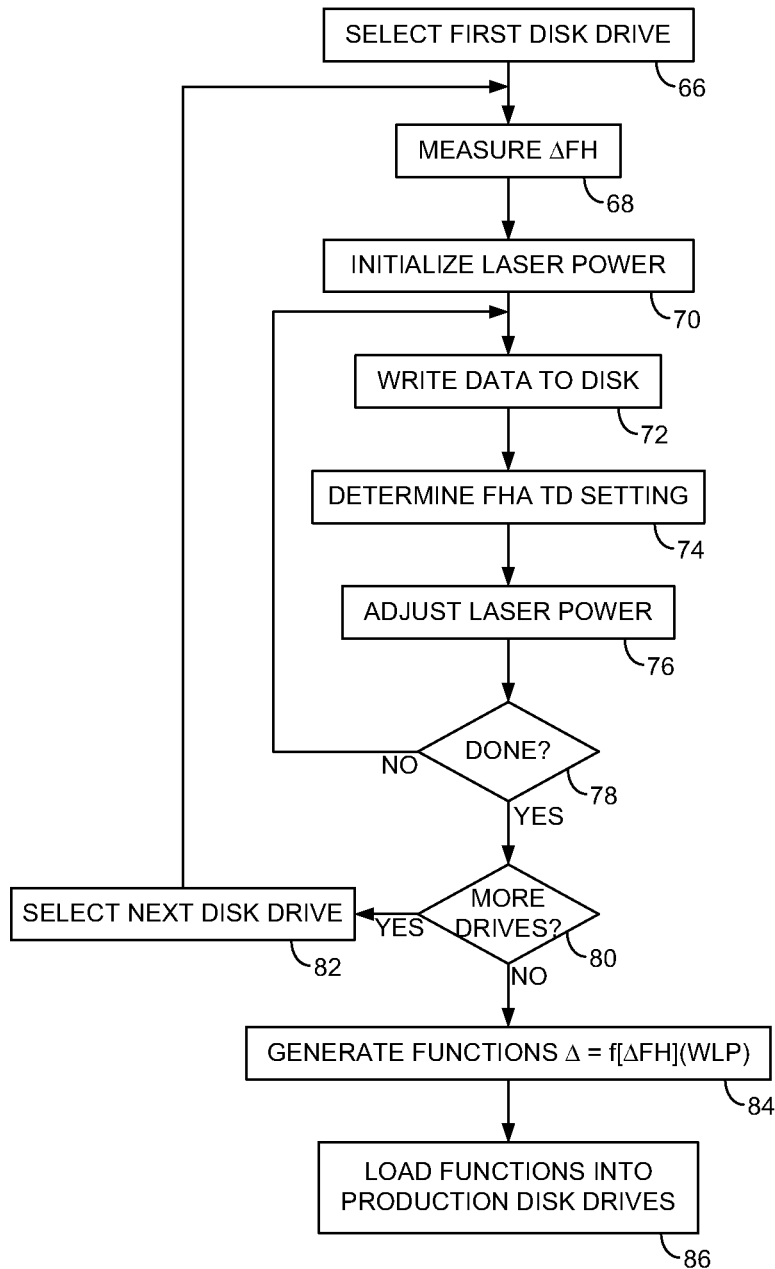
FIG. 7 is a flow diagram according to an embodiment wherein the data points shown in FIG. 3 may be generated by executing a touchdown procedure within a plurality of non-production disk drives in order to generate a plurality of functions each corresponding to a different delta fly height measurement.

As described above, the curve fitted functions shown in FIG. 4C corresponding to different ΔFH measurements may be generated by executing the touchdown operation for a plurality of non-production disk drives. This embodiment is understood with reference to the flow diagram of FIG. 7, wherein a first non-production disk drive is selected (block 66), the ΔFH measured for the disk drive (block 68) as described above, and the laser power initialized, for example, to a low setting (block 70). Data is then written to the disk (block 72) and the FHA setting is adjusted until a touchdown is detected (block 74). If more laser power settings are to be evaluated (block 78), the laser power is adjusted, for example, by increasing the laser power (block 74). Data is again written to the disk (block 72) and the FHA setting is adjusted until a touchdown is detected (block 74). When a sufficient number of data points shown in FIG. 3 have been measured for the current non-production disk drive, the flow diagram of FIG. 7 is repeated after selecting another non-production disk drive (block 82). After measuring the data points of FIG. 3 for a number of non-production disk drives (e.g., at least three), a plurality of functions (one for each ΔFH) for computing the delta FHA touchdown setting relative to the write laser power is generated (block 84). The functions are then loaded into each production disk drive (block 86) where it is used to calibrate the laser power and corresponding FHA write setting by executing the flow diagrams of FIG. 5.

The FHA actuation curve shown in FIGS. 2 and 4B may be generated by measuring the fly height of the head at different FHA settings using any suitable technique. For example, a known technique for measuring the fly height is a harmonic ratio technique (Wallace spacing equation) that measures an absolute head-media spacing (HMS) according to the ratio of the amplitude of the read signal at two different harmonics while reading a periodic pattern from the disk 2 (e.g., a test pattern or a pattern recorded in a servo sector). In one embodiment, this harmonic ratio can be generated by reading a periodic pattern at two different frequencies (e.g., a 2T and 6T pattern).

Although the embodiments are described above as generating a plurality of curve fitted functions (each corresponding to a particular ΔFH) that are loaded into the production disk drives, other techniques may be employed. For example, in one embodiment the array of data points shown in FIG. 3 generated for each ΔFH may instead be loaded into each production disk drive. Each production disk drive may then use the array of data points corresponding to the ΔFH measured for the production disk drive at block 46 of FIG. 5. For example, each production disk drive may generate a curve fitted function, or perform any other suitable operation, such as interpolating between data points or selecting the closest data point for the calibrated WLP. In yet another embodiment, a two-parameter function may be generated which outputs the delta for the FHA write setting based on the two inputs (the calibrated WLP and the measured ΔFH). This two-parameter function may then be loaded into each production disk drive for use in generating the FHA write setting for each production disk drive.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

While the above examples concern a disk drive, the various embodiments are not limited to a disk drive and can be applied to other data storage devices and systems, such as magnetic tape drives, solid state drives, hybrid drives, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
   a disk;
   a head comprising a laser configured to heat the disk while writing data to the disk;
   a fly height actuator (FHA) configured to actuate the head vertically over the disk based on an FHA setting; and
   control circuitry configured to:
      calibrate a write laser power applied to the laser during a write operation;
      measure a first fly height of the head at a first laser power setting;
      measure a second fly height of the head at a second laser power setting different from the first laser power setting; and
      generate a FHA write setting based on the calibrated write laser power and the first and second fly height measurements, where the FHA write setting is applied to the FHA during the write operation.

2. The data storage device as recited in claim 1, wherein the control circuitry is further configured to measure the first and second fly height at a first FHA setting.

3. The data storage device as recited in claim 2, wherein the first FHA setting corresponds to an FHA read setting used to read data from the disk.

4. The data storage device as recited in claim 3, wherein the control circuitry is further configured to calibrate the FHA read setting based on a FHA touchdown setting that causes the head to contact the disk.

5. The data storage device as recited in claim 1, wherein the first laser power setting is substantially zero.

6. The data storage device as recited in claim 1, wherein the head does not contact the disk at the second laser power setting.

7. The data storage device as recited in claim 1, wherein the control circuitry is further configured to measure the second fly height of the head while applying a write current to the head.

8. The data storage device as recited in claim 1, wherein the control circuitry is further configured to generate the FHA write setting based on a difference between the first measured fly height and the second measured fly height.

9. The data storage device as recited in claim 8, wherein the control circuitry is further configured to generate the FHA write setting based on a function of the calibrated write laser power, wherein the function is based on the difference between the first measured fly height and the second measured fly height.

10. The data storage device as recited in claim 8, wherein the control circuitry is further configured to:
   select one of a plurality of functions based on the difference between the first measured fly height and the second measured fly height; and
   generate the FHA write setting based on the selected function.

11. A method of operating a data storage device, the method comprising:
   calibrating a write laser power applied to a laser to heat a disk during a write operation;
   measuring a first fly height of a head at a first laser power setting;
   measuring a second fly height of the head at a second laser power setting different from the first laser power setting; and
   generating a fly height actuator (FHA) write setting based on the calibrated write laser power and the first and second fly height measurements, where the FHA write setting is applied to a FHA to actuate the head vertically over the disk during the write operation.

12. The method as recited in claim 11, further comprising measuring the first and second fly height at a first FHA setting.

13. The method as recited in claim 12, wherein the first FHA setting corresponds to an FHA read setting used to read data from the disk.

14. The method as recited in claim 13, further comprising calibrating the FHA read setting based on a FHA touchdown setting that causes the head to contact the disk.

15. The method as recited in claim 11, wherein the first laser power setting is substantially zero.

16. The method as recited in claim 11, wherein the head does not contact the disk at the second laser power setting.

17. The method as recited in claim 11, further comprising measuring the second fly height of the head while applying a write current to the head.

18. The method as recited in claim 11, further comprising generating the FHA write setting based on a difference between the first measured fly height and the second measured fly height.

19. The method as recited in claim 18, further comprising generating the FHA write setting based on a function of the calibrated write laser power, wherein the function is based on the difference between the first measured fly height and the second measured fly height.

20. The method as recited in claim 18, further comprising:
   selecting one of a plurality of functions based on the difference between the first measured fly height and the second measured fly height; and
   generating the FHA write setting based on the selected function.

* * * * *